United States Patent [19]
Ellis et al.

[11] Patent Number: 5,992,011
[45] Date of Patent: Nov. 30, 1999

[54] METHOD OF ASSEMBLING A BAFFLE TO A DETECTOR FOR DETECTING A RETROREFLECTIVE MARKER

[75] Inventors: Carl E. Ellis, Layton; Carl Hale, North Ogden, both of Utah

[73] Assignee: Iomega Corporation, Roy, Utah

[21] Appl. No.: 08/959,827

[22] Filed: Oct. 29, 1997

[51] Int. Cl.⁶ .................................................. H01R 43/00
[52] U.S. Cl. ........................ 29/825; 29/829; 360/77.03; 369/44.11
[58] Field of Search ................. 29/825, 840; 360/77.03, 360/77.02, 77.01; 369/44.11

[56] References Cited

U.S. PATENT DOCUMENTS

| | | | |
|---|---|---|---|
| 3,718,078 | 2/1973 | Plummer | 95/49 |
| 3,727,045 | 4/1973 | Warren et al. | 246/169 A |
| 3,995,376 | 12/1976 | Kimble et al. | 35/25 |
| 4,080,899 | 3/1978 | Luban | 102/42 R |
| 4,102,059 | 7/1978 | Kimble et al. | 35/25 |
| 4,244,683 | 1/1981 | Rowland | 425/143 |
| 4,291,353 | 9/1981 | Fletcher et al. | |
| 4,332,847 | 6/1982 | Rowland | 428/156 |
| 4,498,882 | 2/1985 | Evert | 441/116 |
| 4,578,042 | 3/1986 | Evert | 441/117 |
| 4,592,554 | 6/1986 | Gilbertson et al. | 273/312 |
| 4,607,978 | 8/1986 | Eigenmann | 404/73 |
| 4,633,451 | 12/1986 | Ahn et al. | 369/14 |
| 4,649,264 | 3/1987 | Carson | 235/54 |
| 4,652,172 | 3/1987 | Eigenmann | 404/73 |
| 4,683,824 | 8/1987 | Gibbs | 102/436 |
| 4,783,672 | 11/1988 | Wirtz et al. | 354/21 |
| 4,904,852 | 2/1990 | Mita et al. | |
| 5,038,359 | 8/1991 | Pepper et al. | 372/99 |
| 5,069,577 | 12/1991 | Murphy | 404/11 |
| 5,084,883 | 1/1992 | Khalid et al. | 372/24 |
| 5,159,560 | 10/1992 | Newell et al. | 364/479 |
| 5,206,869 | 4/1993 | Khalid et al. | 372/24 |
| 5,325,243 | 6/1994 | Rath et al. | 360/71 |
| 5,384,675 | 1/1995 | Crawforth et al. | |
| 5,491,586 | 2/1996 | Phillips | 359/530 |
| 5,638,228 | 6/1997 | Thomas, III | 360/60 |
| 5,650,891 | 7/1997 | Thayne et al. | 360/99.06 |
| 5,778,521 | 7/1998 | Law et al. | 29/829 |

FOREIGN PATENT DOCUMENTS

| | | |
|---|---|---|
| 2135059 | 1/1973 | Germany . |
| 4-61650 | 2/1992 | Japan . |
| 4-167286 | 6/1992 | Japan . |
| 6-168540 | 6/1994 | Japan . |
| 97/19449 | 5/1997 | WIPO . |

OTHER PUBLICATIONS

Jacobs, S.F., "Experiments with retrodirective arrays", *Optical Eng.*, 1982, 21, 281–283.

Rennilson, J., "Retroflection–What is it and how is it used", *ASTM Stand. News*, 1982.

Sugawara, Patent abstracts of Japan, 18, Feb. 10, 1994, Appl. No. 4–113,999.

Venable, W.H. et al., "Factors affecting the metrology of retroreflecting materials", *App. Optics*, 1980, 19, 1242–1246.

Walker, J., "The amateur Scientist: Wonders with the retroreflector, a mirror that removes distortion from a light beam", *Scientific Am.*, 1988, 258, 118–123.

*Primary Examiner*—Carl J. Arbes
*Attorney, Agent, or Firm*—Woodcock Washburn Kurtz Mackiewicz & Norris LLP

[57] ABSTRACT

This invention includes a method of assembling a baffle disposed on a casing to an emitter/detector housing. The emitter/detector housing contains an emitter and a detector that are used to detect the presence of a retroreflective marker on a disk cartridge. Preferably, the method of this invention includes aligning the casing and the baffle with the housing, and slidably engaging the casing with the housing. Once the casing and the housing are engaged, an interference fit is preferably created between the housing and the casing. After the baffle has been attached to the housing, the housing and the baffle may be connected to a circuit board. This circuit board may then be attached to a disk drive.

20 Claims, 8 Drawing Sheets

METHOD OF ASSEMBLING A BAFFLE TO A DETECTOR FOR DETECTING A RETROREFLECTIVE MARKER

BACKGROUND OF THE INVENTION

The present invention relates to a method for assembling a baffle to an emitter/detector in a disk drive. Once assembled the baffle, the emitter and the detector can be used to detect the presence of a marker, such as a retroreflective marker, on a disk cartridge.

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

As used in this application the term disk cartridge refers to any data storage device including tape drives.

Disk drives for receiving removable disk cartridges, including conventional 3.5" floppy disk drives, preferably have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

When a data storage cartridge is inserted into a drive it is important that the type of cartridge be recognized by the drive as the correct type for safe and reliable use in that particular drive. Most removable cartridge drives (magnetic and optical) typically use approximately the same form factor cartridges, i.e., 3.5", 5.25", etc. Hence if one of these cartridges is inserted into the cartridge slot of the non-mating drive there is a large probability that either the drive (heads, load mechanism, electronics, etc.) or the data on the disk could be damaged.

Also, some cartridges are "write protected" by the user to prevent accidental erasure of important data by writing over it. It is important to protect against operation of the drive when an incorrect or write protected cartridge is inserted.

Retroreflective materials have been developed. This material has many periodic miniature corner cubes, or spherical elements, which reflect light striking it almost exactly upon its incident path. Retroreflective array materials are described in Jacobs, S. F., "Experiments with retrodirective arrays," *Optical Engineering*, Vol. 21, No. 2, March/April 1982; Rennilson, J., "Retroreflection—What is it and how is it used?" *ASTM Standardization News*, February 1982; and Venable, W. H., Stephenson, H. F. and Tersteiege, H., "Factor affecting the metrology of retroreflective materials," *Applied Optics*, Vol. 19, No. 8, Apr. 15, 1980.

Recently issued U.S. Pat. No. 5,638,228 (the '228 patent), which issued on Jun. 10, 1997 is commonly assigned and is hereby incorporated by reference. The '228 patent describes a disk cartridge that has a retroreflective material and a disk drive that has a light emitter and a light detector coupled to an electrical circuit that can be used to determine if the correct disk cartridge has been inserted into the disk drive. The emitter and detector determine if the correct data storage cartridge has been inserted into the disk drive by determining whether a data storage cartridge that has a retroreflector has been inserted into the disk drive. As described in the '228 patent, the magnitude of light reflected from a retroreflector to the detector will be greater than that reflected by a spectral (mirror like) or diffuse deflector. Therefore, the detector can determine that a disk cartridge that has a retroreflective marker has been inserted into the disk drive when the magnitude of light received is above a predetermined threshold. Since the magnitude of light reflected from a spectral or diffuse reflector will not exceed the predetermined threshold, the detector will know that an improper data storage cartridge has been inserted when the magnitude of light received does not exceed the predetermined threshold.

By recognizing that the magnitude of light received is above a preset threshold limit, the detector knows that the light has been reflected by a retroreflector, and that the correct disk cartridge has been inserted into the disk drive. After recognizing this, the detector operates in conjunction with an electrical circuit to permit activation of the heads of the disk drive, so that the disk drive can interface with the disk cartridge inserted into a disk drive, the detector will not see light emitted from a retroreflector. In this event, the detector and the electrical circuit will not enable the heads of the disk drive. This prevents the disk drive from operating.

While the emitter detector design disclosed in the '228 patent has proven to be effective for some disk drives, an improved design has been developed. As needed, as disk drives become smaller and smaller in order to meet design constraints, in for example a lap top computer, the distance between the emitter detector pair and the retroreflective marker on a disk cartridge becomes smaller and smaller. Due to design constraints, the distance between the emitter detector pair and the retroreflective marker on a disk cartridge has become so small, that the design disclosed in the '228 patent cannot be used to effectively distinguish between light reflected from a retroreflective surface and light reflected form other surfaces, such as a spectral or diffuse reflectors. At these small distances, the difference in the amount of light seen by the detector from the retroreflective marker and the amount of light seen from other sources becomes so small that it is difficult to distinguish between the sources. Consequently, the detector cannot effectively distinguish between light that has been reflected from other surfaces and light that has been reflected from a retroreflective marker.

In commonly assigned and co-pending United States Application entitled "An Improved Disk Drive For Detecting A Retroreflective Marker On A Data Storage Cartridge," filed on Sep. 15, 1997 and having Ser. No. 08/931,272, which is herein incorporated by reference, an improved disk drive that has an improved emitter/detector that can be used to distinguish between light reflected from a retroreflective marker on a disk cartridge and light reflected from other reflective sources is disclosed. This improved emitter/detector can effectively distinguish between light reflected from a retroreflective marker and other reflective sources when the distance between the emitter/detector and the reflective material is relatively very small. The disk drive disclosed in that application has a baffle disposed between the emitter and the detector. The invention of this application includes a method of attaching the baffle to the emitter and the detector.

SUMMARY OF THE INVENTION

In order to determine whether a data storage cartridge has a retroreflective marker, a disk drive may have an emitter and a detector disposed in a housing. A baffle is preferably disposed between the emitter and the detector. The emitter, the detector and the baffle distinguish between light reflected from a retroreflective marker on a disk cartridge and light reflected from other sources.

According to the method of this invention, the baffle is attached to a casing and is assembled to the emitter/detector housing between the emitter and the detector. This method of assembling the baffle to the emitter/detector housing may include disposing the baffle in a position so that the baffle is in between the emitter and the detector disposed in the housing. The step of aligning may also include aligning the casing and the baffle with the housing, so that the casing can slidably engage the housing in an interference fit. This step of aligning may further include aligning a width of the interior of the casing with a corresponding width of the exterior of the housing, so that when the housing is slidably engaged with the casing an interference fit is created. Preferably, the interior width of the casing is slightly smaller than the exterior width of the housing, so that an interference fit can be created.

The step of aligning may further include aligning an interior length of the casing with an exterior length of the housing, so that when the casing is slidably engaged with the housing an interference fit is created. In a preferred embodiment, the exterior length of the housing is slightly larger than the interior length of the casing.

After aligning the baffle and the casing with the emitter/detector housing, the method of this invention may include inserting the housing into the casing. The housing can be inserted into an interior of the casing in order to create an interference fit between the housing and the casing. As described above, the interior dimensions of the casing and the exterior dimensions of the housing are such that when the housing slidably engages the casing an interference fit is created between the interior of the casing and the exterior of the housing.

In a preferred embodiment, the casing has at least four sides and two of the sides oppose each other. A hollow interior for receiving the housing is defined by the four sides of the casing. Extending from the interior of each side of the casing may be a tab. Preferably, the housing can be press fit in between the tabs by sliding the exterior of the housing in between the tabs.

After the baffle has been attached to the housing, the baffle and housing may be attached to a circuit board that may be disposed within a disk drive. This step of attaching may include inserting a leg of the baffle into an aperture in the circuit board. Soldering may then be used to further connect the leg to the circuit board. In a preferred embodiment, the leg of the baffle has a tip that can be soldered to the circuit board.

This invention includes attaching a baffle to an emitter/detector housing in an interference fit. Thus, although attaching a specific baffle is described above, other baffles having different shaped and sized casings may be used in order to attach a baffle to an emitter detector housing.

The foregoing and other objects, features and advantages of the invention will be better understood from the following more detailed description and appended claims.

DESCRIPTION OF THE PREFERRED EMBODIMENTS

Figure 1:
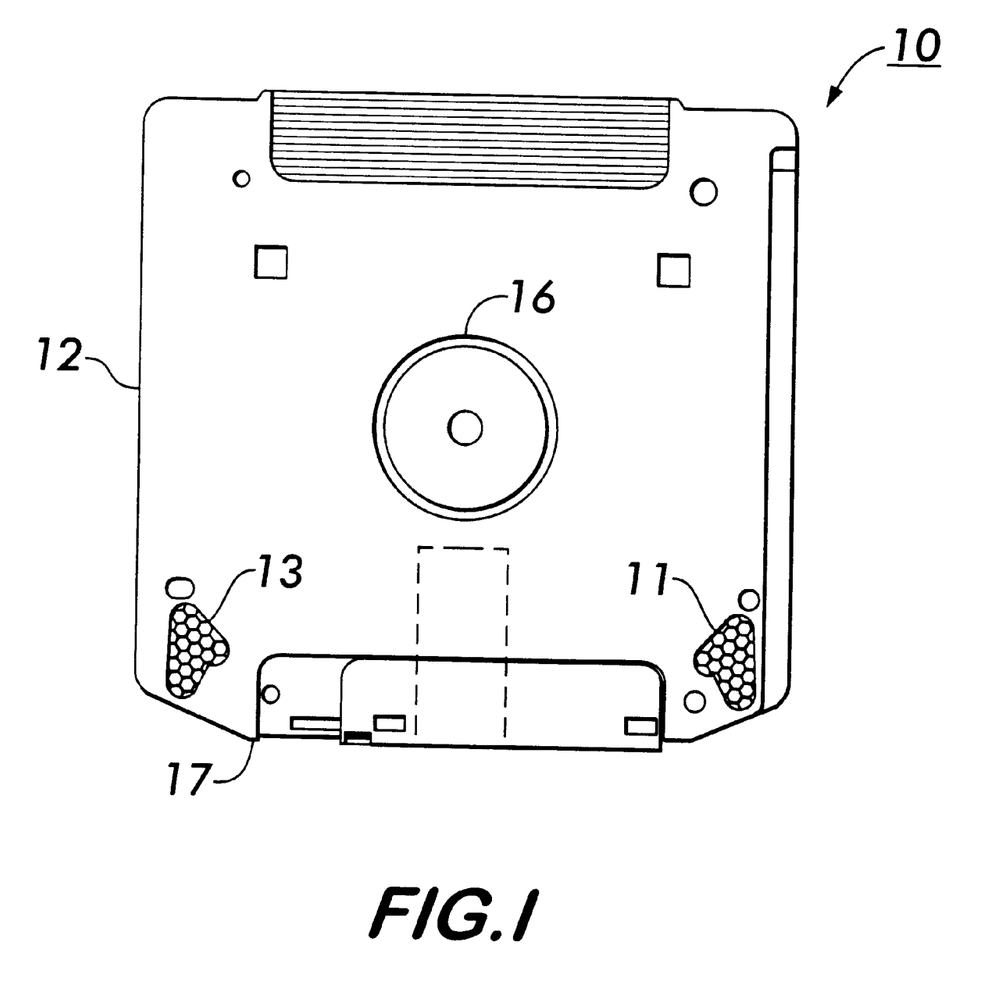
FIG. 1 shows a data storage cartridge that can be used with a disk drive that has an assembly formed by a preferred method of this invention.
Figure 2:
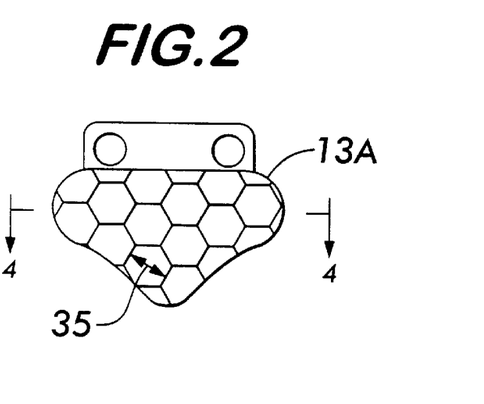
FIGS. 2, 3 and 4 are plan, top and edge views respectively of a portion of the data storage cartridge of FIG. 1.
Figure 3:
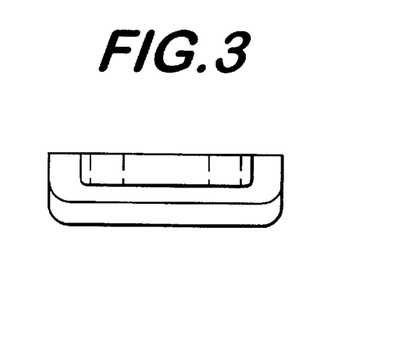
Figure 4:
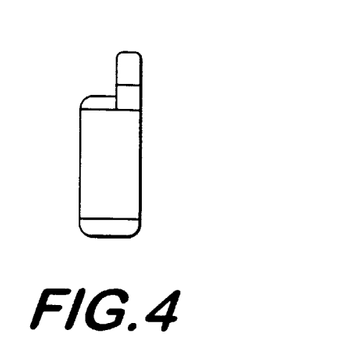
Figure 5:
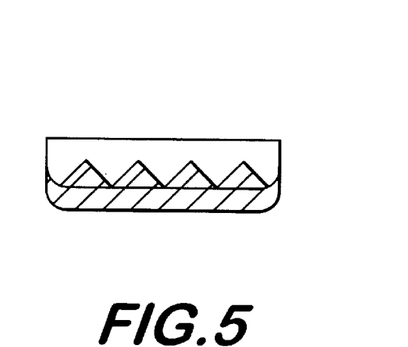
FIG. 5 is a section on the section line 5—5 of FIG. 4.
Figure 6:
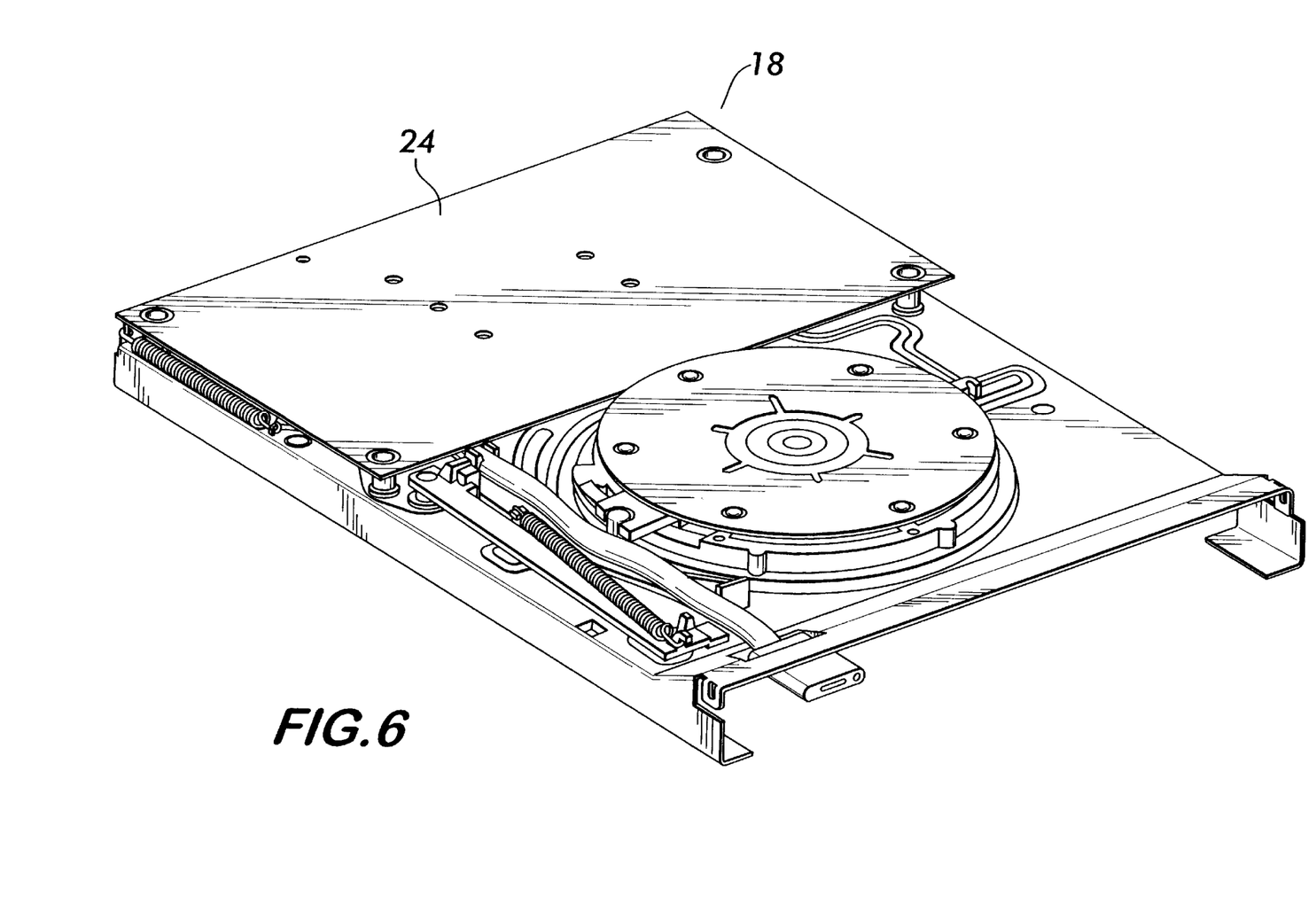
FIG. 6 is a perspective view of a disk drive of the type that has an assembly formed by a preferred method of this invention.
Figure 7:
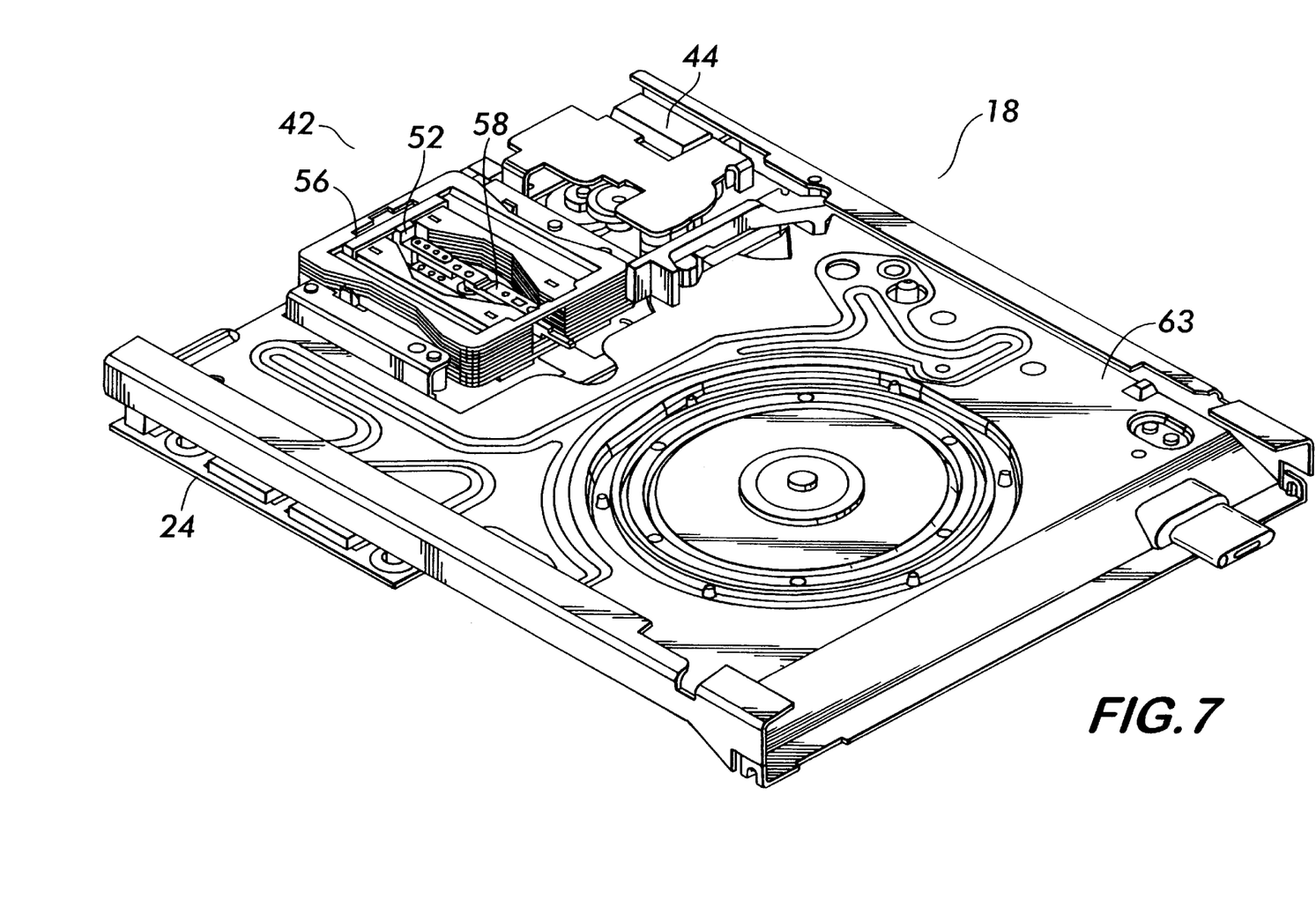
FIG. 7 is another perspective view of the disk drive of FIG. 6.
Figure 8:
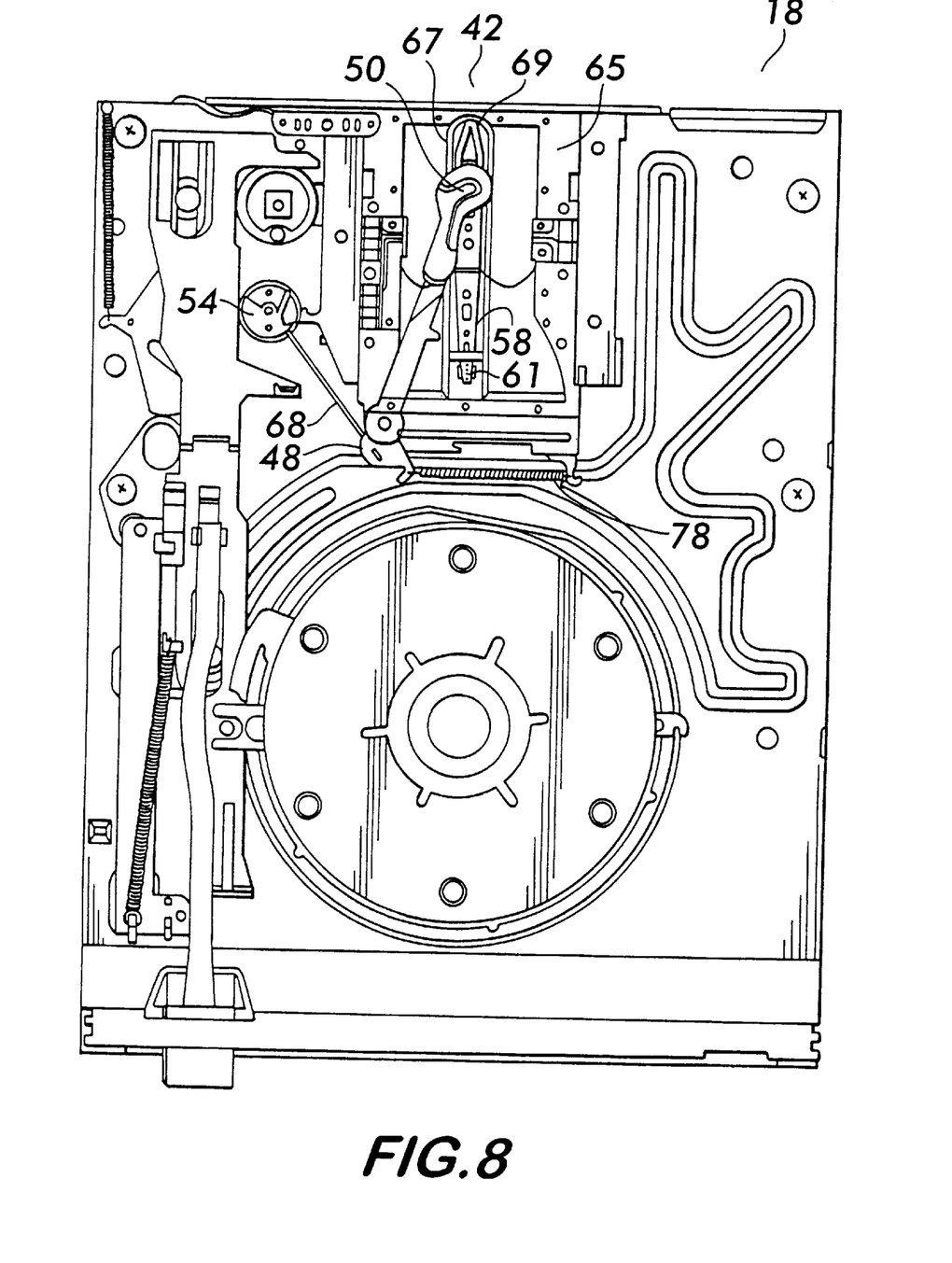
FIG. 8 is a cross sectional view of the disk drive of FIG. 6.

FIG. 1 illustrates a data storage cartridge that can operate in accordance with a disk drive that uses an assembly formed by this invention. This data storage cartridge is described in commonly assigned U.S. Pat. No. 5,650,891 entitled "Apparatus for Performing Multiple Functions in a Data Storage Device Using a Single Electro-Mechanical Device," issued on Jun. 22, 1997 (Attorney Docket No. 8906), which is hereby incorporated by reference.

The disk cartridge 10 comprises an outer casing 12 having upper and lower shells that mate to form the casing. A disk-shaped recording medium is affixed to a hub 16 that is rotatably mounted in the casing 12. An opening on the bottom shell of the casing 12 provides access to the disk hub 16. A head access opening in the front peripheral edge 17 of the disk cartridge 10 provides access to the recording surfaces of the disk by the recording heads of a disk drive.

A retroreflective marker, or tag, 11 is positioned on the cartridge to be detected by the detector in the disk drive. A write protected marker 13 of retroreflective material may be applied to the cartridge if it is "write protected."

The markers 11, 13 may be an acrylic retroreflective marker, as shown in FIGS. 2–5. These markers are an array of retroreflective corner cubes whose pitch and flat-to-flat distance is slightly greater than the distance between the emitter/detector (E/D) pair of the disk drive described below that is used to sense the markers. The pitch on the marker's corner cubes is preferably 94 mils. The emitter described below may be spaced about 70 mils from the phototransistor in the E/D pair.

The ability to sense the tag or marker stems from the fact that each corner-cube element of the marker, of which there are preferably nine, reflect the diffuse light incident on them back at the emitter and the detector with an illuminance profile that is annular. If a retroreflector has a size (diameter) which is slightly greater than 70 mils, i.e., 94 mils, the returned light distribution from each retroreflective element will have a donut shaped distribution around the center of the emitter. The donut's radius will about 94 mils. A segment, or lobe, of this donut illuminates the detector 22. The marker may also be made of Reflexite.

A disk drive 18 that may be used with a detection device 20a formed by the method of this invention described below may include an electrical circuit and a head retraction system 42. This disk drive is described with reference to FIGS. 6–8 and 14. The head retraction system and other components of this disk drive 18 are described in commonly assigned co-pending application entitled "An Improved Operating System For Operating An Eject System And A Head Retraction System of A Disk Drive," Ser. No. 08/866, 189 filed May 30, 1997, which is hereby incorporated by reference.

Figure 9:
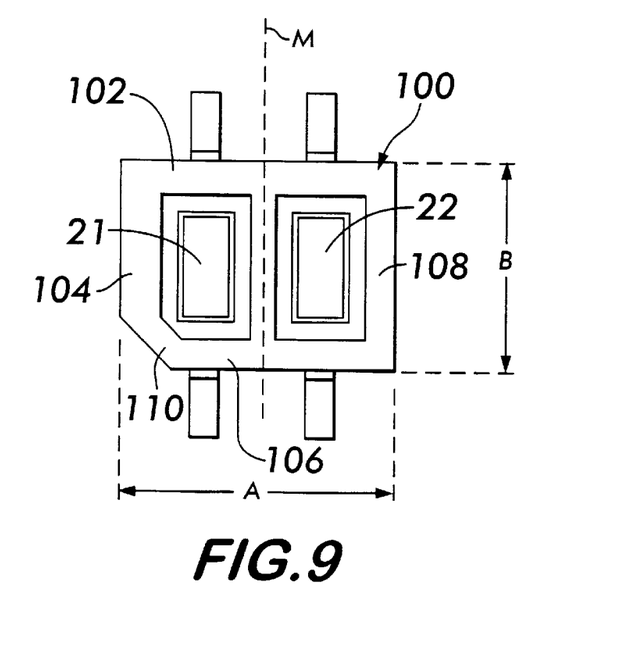
FIG. 9 is a top view of an emitter and a detector that can be used with a preferred method of this invention.
Figure 10:
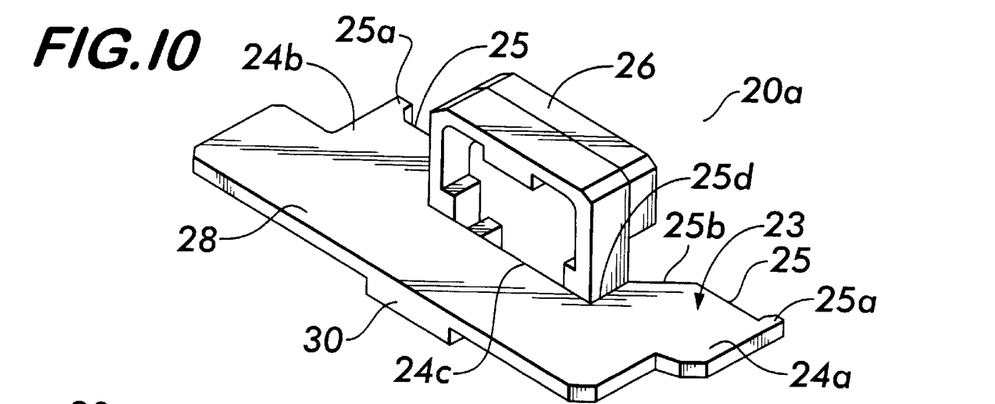
FIG. 10 is an isometric view of a detection device that can be formed with a preferred method of this invention.

A detection device 20a that can be used with a preferred method of this invention includes an emitter/detector pair 21, 22 disposed in a housing 100, shown in FIG. 9, and a baffle 23 attached to a casing 26, as shown in FIG. 10. According to a preferred method of this invention, the housing 100 is attached to the casing 26 in order to attach the baffle 23 in between the emitter 21 and the detector 22. The emitter/detector pair 21, 22 and the baffle 23 are positioned in the drive 18 to detect the retroreflective marker 11 or the marker 13 and to unlock the heads on the actuator. The emitter/detector pair includes a LED light source 21 and a detector 22.

Figure 14:
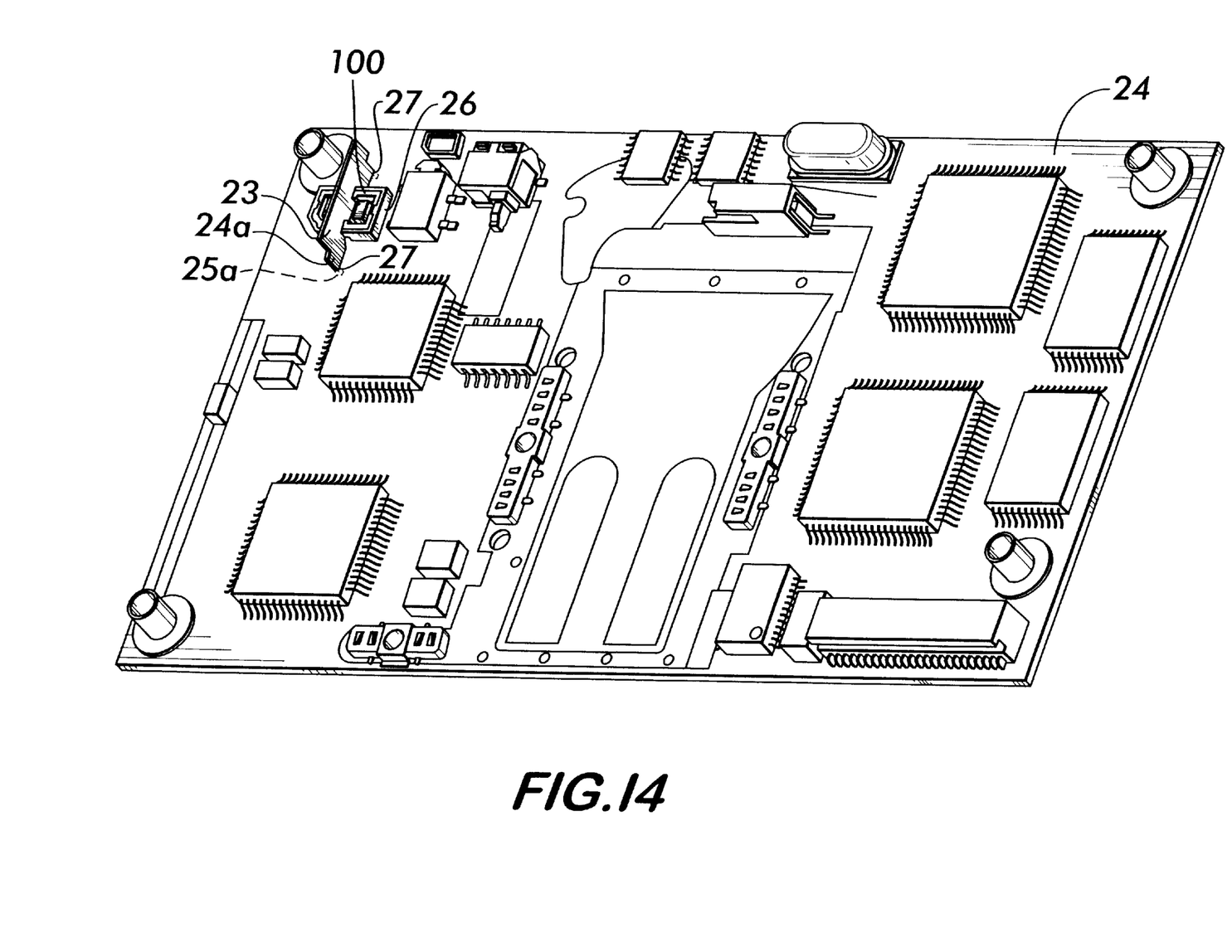
FIG. 14 is an isometric view of the disk drive of FIG. 6.

The emitter 21, detector 22 and the baffle 23 are preferably disposed on a printed circuit board 24 (PCB), as shown in FIG. 14. This PCB 24 is preferably connected to the disk drive and the emitter and detector respectively emit and detect light through slots in the chassis of the disk drive. A suitable emitter/detector is commercially available, for example, from Sharp Corporation and designated Model No. GP 2S27.

The detector 22 is closely spaced to the LED emitter 21. Therefore, the detector 22 will optimally respond to light which is emitted from the source 21, and reflected from the retroreflective material in the marker 11, and is incident upon the detector 22 along the same wave path that the light was emitted. The spacing between the marker and the emitter and detector is denoted by the arrow 25 in FIG. 13. In a preferred embodiment, the length of the arrow is approximately 3.35 mm.

Illustrated in FIGS. 9–12 is the emitter 21, detector 22 and the baffle 23. As shown in these figures, the emitter 21 and the detector 22 are disposed in a housing 100. The method of attaching the baffle 23 to the housing 100 is described below. The housing 100 may be constructed from plastic or another suitable material. Preferably, the housing 100 has five edges, 102, 104, 106, 108 and 110. Edge 110 may be angled. Although this housing 100 has five edges, the method of this invention may be used with a housing that any number of edges. Furthermore, the housing 100 need not take the shape of the embodiment illustrated in FIG. 9.

The housing 100 preferably has dimensions that facilitate it being attached to the casing 26 according to a preferred method of this invention. Preferably, the housing 100 has a size measured by the distances, denoted as "A" and "B." In a preferred embodiment of this invention, the distance A is equal to about 4.00 mm., and the distance B is equal to about 3.00 mm. Although this is a preferred embodiment, the housing 100 may have other dimensions and shapes. That is, the housing 100 may have other sizes and shapes so that it can be attached to the casing 26, as described below.

Depicted in FIG. 10 is a casing 26 that has four edges 26a, 26b, 26c and 26d. The edges are joined to form a periphery of the casing 26. The casing 26 may also have chamfered edges 26e, 26f, 26g, 26h on each corner of the casing 26 that join the edges 26a, 26b, 26c and 26d.

Furthermore, the casing 26 may have a four tabs 112 disposed around its interior. These tabs 112 extend from the interior wall of the casing 26. In a preferred embodiment of this invention, the distance L between the tabs on opposing sides of the casing 26 is equal to about 3.80 mm., and the distance W between the other tabs 112 is equal to about 2.98 mm. Furthermore, the casing 26 may have a tab 114 extending from the interior of the chamfered edge 26f.

The baffle 23 may be constructed from plastic or from another material, such as metal. The baffle 23 includes a wall 28 and a tongue 30. The wall 28 preferably extends perpendicular to the casing 26 and is disposed between the emitter 21 and the detector 22. The tongue 30 is connected to the wall 28 and preferably extends from the top of the wall 28 towards the emitter 21. The tongue 30 extends perpendicular to the wall 28.

In a most preferred embodiment, the distance denoted as $d_1$ of the tongue 30 is equal to about 0.7 mm., as shown in FIG. 14. The height of the wall, denoted as h, is preferably 2.4 mm. The closest reflective surface to the detector is about 3.35 mm. Although these are the preferred dimensions of the baffle 23, various combinations of the height h and the distance $d_1$ can be used to accomplish the same result. For example, if the height h is greater, a smaller distance $d_1$ can be used, and if the height h is smaller, a greater distance $d_1$ can be used.

As shown in FIG. 10, the baffle 23 may have a first leg 24a, a second leg 24b and an engaging side 24c for engaging the emitter/detector casing 26. The engaging side 24c preferably runs in the direction of the longitudinal axis of the baffle 23. Although only the first leg 24a is clearly illustrated in FIG. 10, it will be appreciated that the second leg 24b is a mirror image of the first leg 24a.

The first leg 24a may have a tip 25a, a bottom 25, an angled surface 25b and a transverse side 25d. The second leg 24b may also have a tip 25a, a bottom 25, an angled surface 25b and a transverse surface 25d. For purposes of brevity, the portions of the first leg 24a are described below. It will be appreciated, however, that the corresponding portions of the second leg 24b operate in a similar manner. It will be further appreciated that the baffle 23 may have other embodiments.

The transverse side 25d of the first leg 24a preferably runs transverse to the engaging side 24c. In a preferred embodiment, the length of the transverse side 25d is approximately equal to the height $h_1$ of the housing, as denoted in FIG. 12.

Preferably, the baffle 23 and the casing 26 are an manufactured by injection molding techniques. In this preferred embodiment, the baffle 23 and the casing 26 are an integral piece. Although this is a preferable way of manufacturing the baffle 23 and the casing 26, other methods may be employed. For instance, the baffle 23 and the casing 26 may be formed as separate pieces and attached together.

A preferred method of this invention, includes attaching the casing 26 that has the baffle 23 to the emitter/detector housing 100. This method includes aligning the casing 26 with the housing 100, so that the baffle 23 is disposed between the emitter 21 and the detector 22. This may include aligning the baffle 23 with a line "M" through the midpoint of the housing 100. For example, the casing 26 shown in FIG. 11 would be rotated about 90 degrees in the clockwise direction in order to mate with the housing shown in FIG. 9. Aligning the casing 26 with the housing 100 may also include, disposing a tab of the casing 26 proximal to the corresponding side of the housing 100. Furthermore, the method may also include disposing the other tabs proximal to the corresponding sides of the housing 100. This may be accomplished by aligning the angled edge 26f of the casing 26 with the angled side 110 of the housing 100. As can be seen by examining the figures, if the angled edge 26f of the casing 26 is aligned with the angled side 110 of the housing 100, the baffle 23 will be properly aligned with the emitter 21 and the detector 22 and the tabs of the casing 26 will be properly aligned with the sides of the housing 100.

Figure 11:
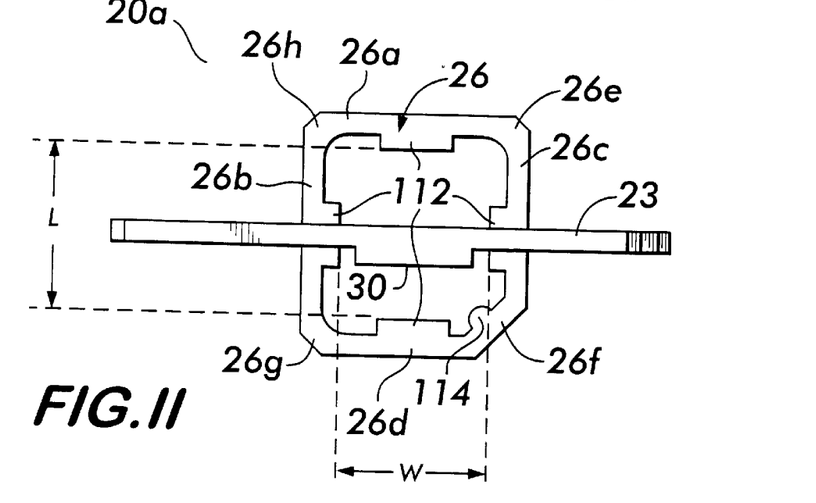
FIG. 11 is top view of the detection device of FIG. 10.
Figure 12:
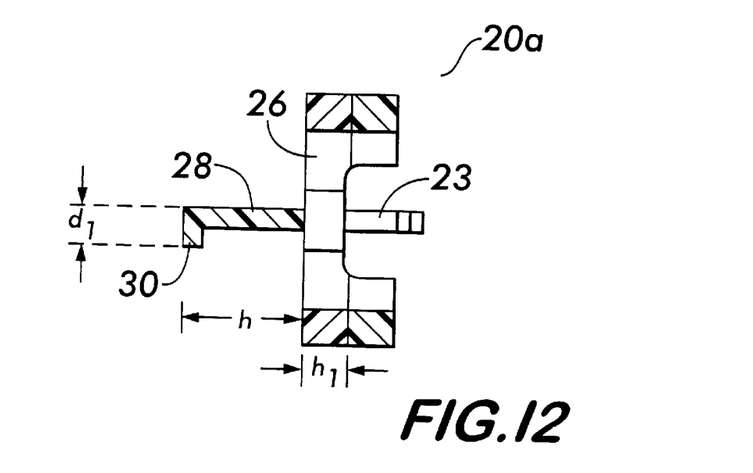
FIG. 12 is a cross sectional view of the detection device of FIG. 10.

After aligning the casing 26 with the housing 100, the casing 26 can be inserted over the housing 100 and attached to the housing 100 with an interference fit. This includes pushing the housing 100, so that the sides of the housing 100 engage each of the respective tabs, including the tab 114 extending from the chamfered edge 26f. After the edges of the housing 100 are engaged with the tabs of the casing 26, the casing 26 can be press fit over the housing 100. This may include slidably engaging or pushing the casing 26 over the housing 100 or alternatively, pushing the housing 100 into the casing 26. As the housing 100 and the casing 26 are pushed or slid together, a tight interference fit will be created between the housing 100 and the casing 26. This occurs between as described above, the interior dimensions of the casing 26 are preferably slightly smaller than the exterior dimensions of the housing 100. For instance, the length L is preferably about 3.80 mm. and the corresponding distance A of the housing 100 is about 4.00 mm. Similarly, the distance W of the casing 26 is about 2.98 mm., and the corresponding distance B of the housing 100 is about 3.00 mm. Thus, because of these preferred dimensions as the housing 100 and the casing 26 are fit together, the tabs of the casing 26 will be expanded outward. In effect, the tabs will be pushed outward and spring loaded as they rest up against the edges of the housing 100 in a tight interference fit. This method may be accomplished by hand or with a machine.

Once the casing 26 is press fit to the housing 100, the casing 26 and the housing 100 may be connected to the circuit board 24, as shown in FIG. 14. This includes placing the tips 25a of the legs into apertures 27 in the circuit board 24. In addition, soldering may be used around the tips 25a of the legs 24a, 24b to further connect the baffle 23, the casing 26 and the housing 100 to the circuit board 24. Once inserted into the apertures 27 in the circuit board 24, the baffle 23 rests on the circuit board 24.

By way of background, the operation of the baffle 23 is provided. There is a certain tongue length for a given wall height to which essentially no light from the front surface of the cartridge with is reflected specularly (Snell's law governed) will enter the aperture of the detector upon reflection. One will also find that there is for the same wall height a slightly longer tongue length which will inhibit any diffuse reflection for the same geometrically positioned surface from entering the aperture of the detector upon reflection. If this tongue length is less than the flat-to-flat distance of the hexagonal corner cube element (retroreflective element) and the corner cube element is aligned appropriately, some reflection from the corner cube will enter the aperture of the detector. If the tongue length needed is less than ½ the flat-to-flat distance the relative alignment between the retroreflective elements and the emitter detector pair and the light baffle becomes significantly less critical. Also the emitter (LED) must have an output divergence angle which is large enough, or directed in such a manner such that a significant portion of the energy is spread over an area outside the confines baffle tongue dimensions projection in space. The Full Width Half Maximum (FWHM) point for the source radiation distribution (LED) is on the order of 40 to 60 degrees. In a preferred embodiment, the tongue length is limited to about ⅓ of the flat-to-flat distance of the corner cube or about 0.75 mm such that alignment of the emitter detector pair to the retroreflective cartridge marker is not critical to better than ±1 mm.

Figure 13:
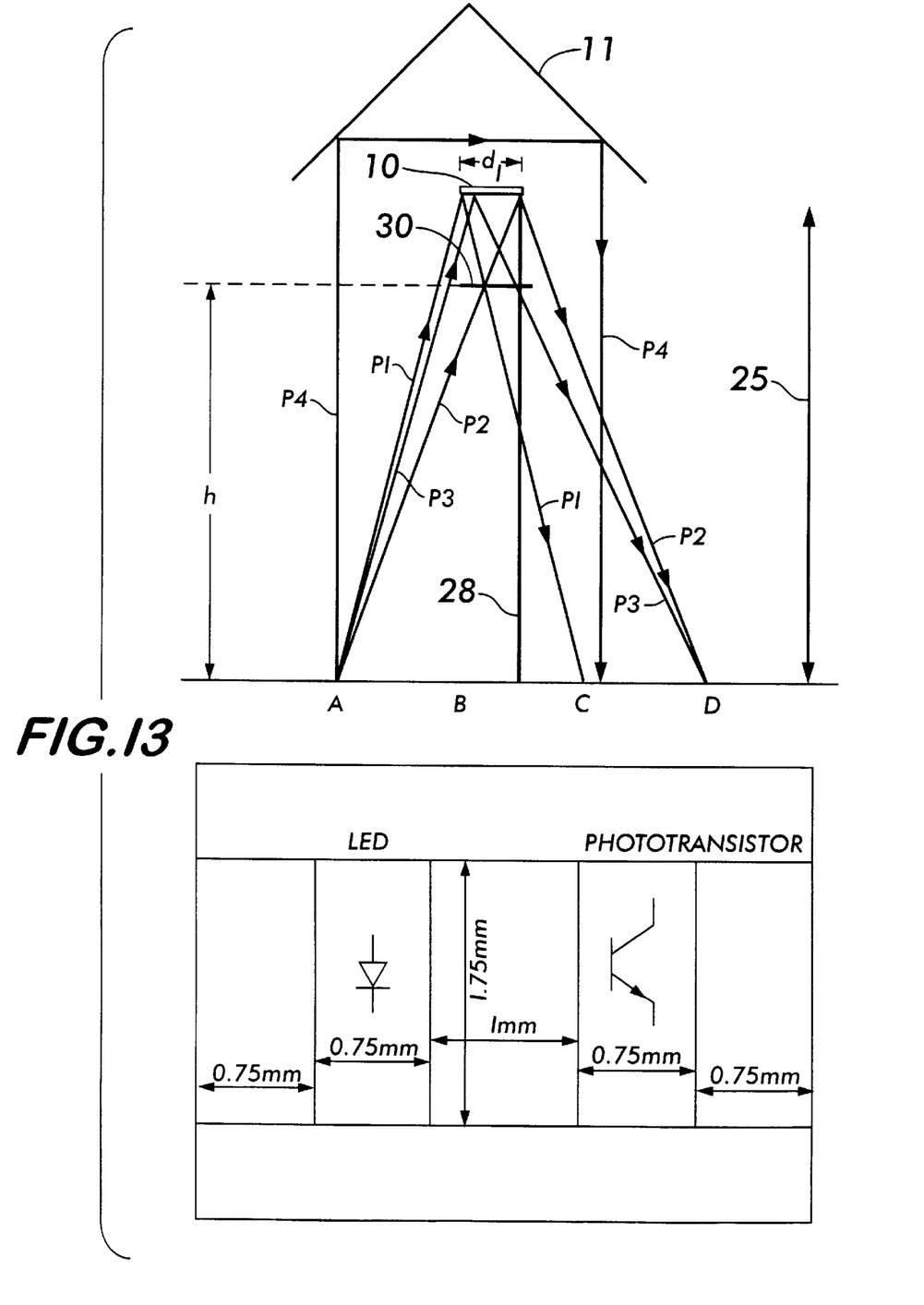
FIG. 13 illustrates the operation of the detection device of FIG. 10.

FIG. 13 depicts schematically how the baffle 23 functions to reduce the amount of light reflected from the diffuse and specular reflectors to the detector 22. As shown, the light ray designated as P1, is inhibited from reaching the edge of the detector. Light Ray P1 is not seen by the detector 22 because upon reflection the light ray hits the tongue 30 of the baffle 23 and is thereby inhibited from reaching the detector 22. Similarly, the specular light ray denoted as P2 is not seen by the detector 22. This light ray hits the tongue 30 of the baffle 23 before it is reflected. Therefore, it never reaches the detector 22. This light ray P2 would have been a specular reflection and not a light ray that would be reflected by the retroreflective marker 11. These light rays P1, P2 are discussed for illustrative purposes. Similar light rays will not reach the detector 22 as they will be blocked by the tongue 30 and the wall 28 of the baffle 23.

Light ray P3 illustrates the limiting diffuse reflection case. As is illustrated, light ray P3 is prevented from reaching the detector 22 by the tongue 30 of the baffle 23a. In other embodiments, the light ray P3 could be blocked by the tongue upon emission before it reaches a reflective source.

A light ray P4 reflected from the retroreflective marker is also shown in FIG. 13. As shown, light ray P4 reflects into the detector 22 and is not inhibited by the baffle 23.

Light ray P3 in FIG. 13 illustrates the limiting diffuse reflection case. Starting at the far edge of the detector aperture (point D) one sends a light ray back over the top edge of the baffle wall height. This ray strikes the reflecting surface at some point. Using geometry one may then calculate the required tongue length to inhibit a light ray traveling from the far edge of the emitter (point A) to this limiting case diffuse reflection point. In order to keep the tongue length at about ⅓ the corner cube flat-to-flat dimension it is necessary to have the wall height be approximately 70% of the total distance between emitter/detector pair (EDP) and the reflective surface.

Because the baffle 23 blocks light rays that would be reflected from objects other than the retroreflective marker 11, the relative amount of light that the detector 22 sees from the retroreflective marker 11 relative to the light from other sources is increased. Therefore, if light at a certain intensity is seen, the detector 22 will know that it is being reflected by the retroreflective marker and that a disk cartridge 10 with a retroreflective marker 11 has been asserted into the disk drive 18.

In summary, this invention includes a method of assembling a baffle 23 disposed on a casing 26 to an emitter/detector housing 100. This method may include aligning the baffle 23 with the housing 100, and slidably engaging the casing 26 to the housing 100. When the casing 26 and the housing 100 are slidably engaged, an interference fit is created between the casing 26 and the housing 100.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. A method of assembling a baffle disposed on a casing to an emitter/detector housing for detecting the presence of a retroreflective marker on a disk cartridge, comprising:

aligning the casing with the housing; and slidably engaging the casing with the housing to create an interference fit.

2. The method of claim 1, wherein the step of slidably engaging the casing with the housing comprises expanding a tab disposed on an interior of the casing as the housing and casing are slidably engaged.

3. The method of claim 1, further comprising the step of inserting a leg of the baffle into a circuit board.

4. The method of claim 3, further comprising the step of soldering the leg of the baffle to the circuit board.

5. The method of claim 1, wherein the casing comprises an interior that has a pair of opposing sides and a tab extending from each side.

6. The method of claim 5, wherein the step of slidably engaging comprises fitting the housing between the tabs and creating the interference fit between the tabs and the housing.

7. The method of claim 1, wherein an interior length of the casing is smaller than an exterior length of the housing, so that when the casing is slidably engaged with the housing the interference fit is created.

8. The method of claim 1, wherein an interior length of the casing is smaller than an exterior length of the housing and an interior width of the casing is smaller than the exterior width of the housing, so that when the casing is slidably engaged with the housing the interference fit is created.

9. The method of claim 1, wherein the step of slidably engaging comprises pushing the casing over the housing so that tabs disposed on opposing interior sides of the casing are expanded by an exterior of the housing and thereby creating the interference fit.

10. The method of claim 1, wherein the interference fit comprises a tab disposed on opposing sides of an interior of the casing that are press fit against an exterior of the housing.

11. A method of assembling a baffle disposed on a casing to an emitter/detector housing that has an emitter and a detector for detecting the presence of a retroreflective marker on a disk cartridge, comprising:

aligning the casing with the housing so that the baffle is disposed in between the emitter and the detector of the housing; and slidably engaging the casing with the housing to create an interference fit.

12. The method of claim 11, wherein the step of slidably engaging the casing with the housing comprises expanding a tab disposed on an interior of the housing as the housing and the casing are slidably engaged.

13. The method of claim 11, further comprising the step of inserting a leg of the baffle into a circuit board.

14. The method of claim 13, further comprising the step of soldering the leg of the baffle to the circuit board.

15. The method of claim 11, wherein the casing comprises an interior that has a pair of opposing sides and a tab extending from each side.

16. The method of claim 15, wherein the step of slidably engaging comprises fitting the housing between the tabs and thereby creating the interference fit between the tabs and the housing.

17. The method of claim 11, wherein an interior length of the casing is smaller than an exterior length of the housing, so that when the casing is slidably engaged with the housing the interference fit is created.

18. The method of claim 11, wherein an interior length of the casing is smaller than an exterior length of the housing and an interior width of the casing is smaller than an exterior width of the housing, so that when the casing is slidably engaged with the housing the interference fit is created.

19. The method of claim 11, wherein the step of slidably engaging comprises pushing the casing over the housing so that the tabs disposed on opposing interior sides of the casing are expanded by an exterior of the housing and thereby creating the interference fit.

20. A method of assembling a baffle disposed on a casing that has a pair of opposing interior sides and a tab extending from each interior side to an emitter/detector housing that has an emitter and a detector for detecting the presence of a retroreflective marker on a disk cartridge, comprising:

aligning the casing with the housing so that the baffle is disposed between the emitter and detector;

aligning the casing with the housing so that the housing can be fit between the tabs extending from the interior of the casing; and slidably engaging the housing between the tabs so that an interference fit is created between the tabs of the casing and the housing.

* * * * *